(12) United States Patent
Rossi

(10) Patent No.: US 6,321,957 B1
(45) Date of Patent: *Nov. 27, 2001

(54) ARM LEG OR NECK WATERTIGHT CONTAINER, FOR HOUSING VALUABLES AND SMALL ARTICLES, SAFELY FASTENABLE TO HUMAN MEMBERS OR TO THE NECK OF DOGS AND OTHER DOMESTIC ANIMALS

(76) Inventor: Federico Rossi, Via Amola 5, I-47037, Rimini (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/952,101
(22) PCT Filed: May 8, 1996
(86) PCT No.: PCT/EP96/01981
§ 371 Date: Jan. 23, 1998
§ 102(e) Date: Jan. 23, 1998
(87) PCT Pub. No.: WO96/35348
PCT Pub. Date: Nov. 14, 1996

(30) Foreign Application Priority Data

May 10, 1995 (IT) .............................. FO95A0006

(51) Int. Cl.⁷ ..................................... A44C 5/18
(52) U.S. Cl. .................. 224/221; 206/811; 220/4.21; 220/23.86; 224/191; 224/222; 224/934
(58) Field of Search ..................................... 224/241, 236, 224/235, 219, 221, 222, 191, 934; 383/59, 60, 109, 110, 111, 112, 118; 220/23.86, 23.87, 23.89, 23.9, 796, 4.21; 206/811

(56) References Cited

U.S. PATENT DOCUMENTS

| 1,325,607 | * | 12/1919 | Barber ................................... 224/219 |
| 1,689,396 | * | 10/1928 | Lang ...................................... 224/235 |
| 1,820,582 | * | 8/1931 | Strayer ............................. 206/811 X |
| 1,986,057 | * | 1/1935 | Hackworth ....................... 206/811 X |
| 2,006,773 | * | 7/1935 | Moore et al. .......................... 224/235 |
| 3,133,663 | * | 5/1964 | Schurman et al. .................... 220/796 |
| 3,346,099 | * | 10/1967 | Thomas et al. ...................... 206/539 |
| 4,440,525 | * | 4/1984 | Perla ................................ 224/664 X |
| 4,569,465 | * | 2/1986 | O'Farrell .............................. 224/660 |
| 4,703,161 | * | 10/1987 | McLean .......................... 206/811 X |
| 5,511,390 | * | 4/1996 | Mah .................................. 206/811 X |

FOREIGN PATENT DOCUMENTS

| 129 440 | * | 1/1929 | (CH) ..................................... 224/219 |
| 140 275 | * | 5/1930 | (CH) ..................................... 224/219 |

* cited by examiner

Primary Examiner—Gene Mancene
Assistant Examiner—Joseph C. Merek
(74) Attorney, Agent, or Firm—J. Harold Nissen; Lackenbach Siegel

(57) ABSTRACT

A watertight container (10), comprising a rigid watertight box (32, 132, 232, 332) connected by means of a wrist strap (12) to limbs or other members of the human or animal body, allows to safely carry, contiguously to the arm, the leg, or the neck, small size articles, such as either wounded or folded banknotes, valuables, pills, jewels, etc. also in situations of water immersion such as bathing or swimming, excessive sweating, steal or robbery dangers, engaging sporting activities, etc, thanks to the watersealing feature of the box (32, 132, 232, 332), provided with suitable gaskets seals (62, 66), to the anatomical suitability and the strength of the wrist strap (12) housing the box (32, 132, 232, 332).

16 Claims, 13 Drawing Sheets

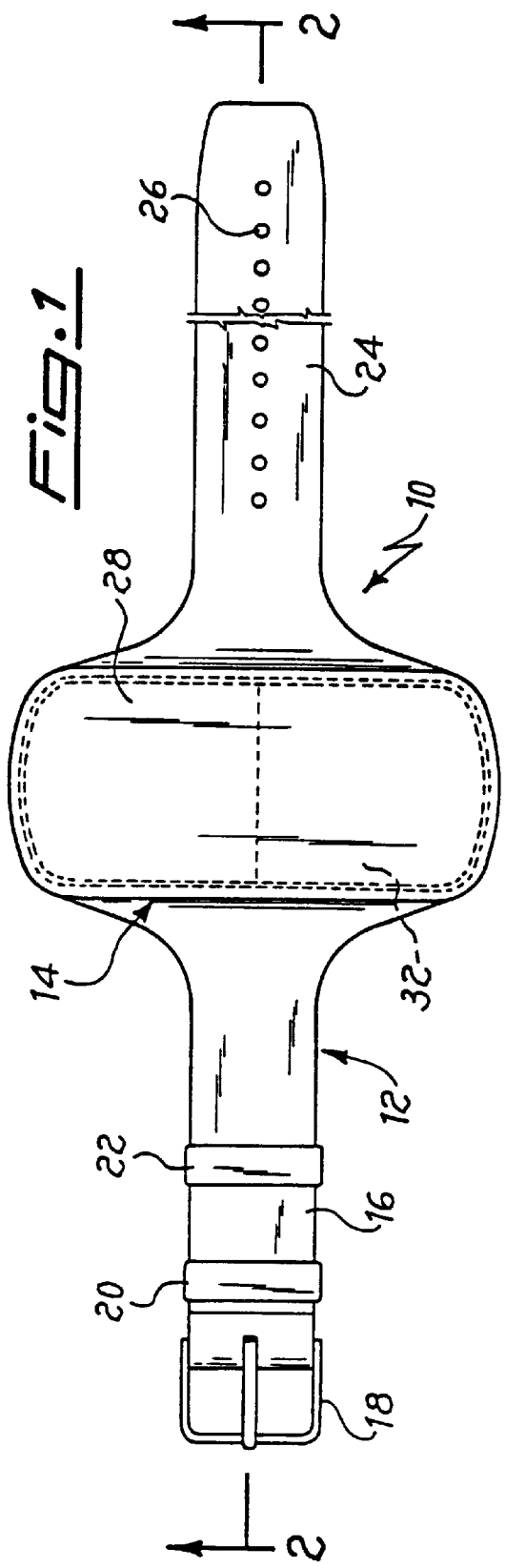

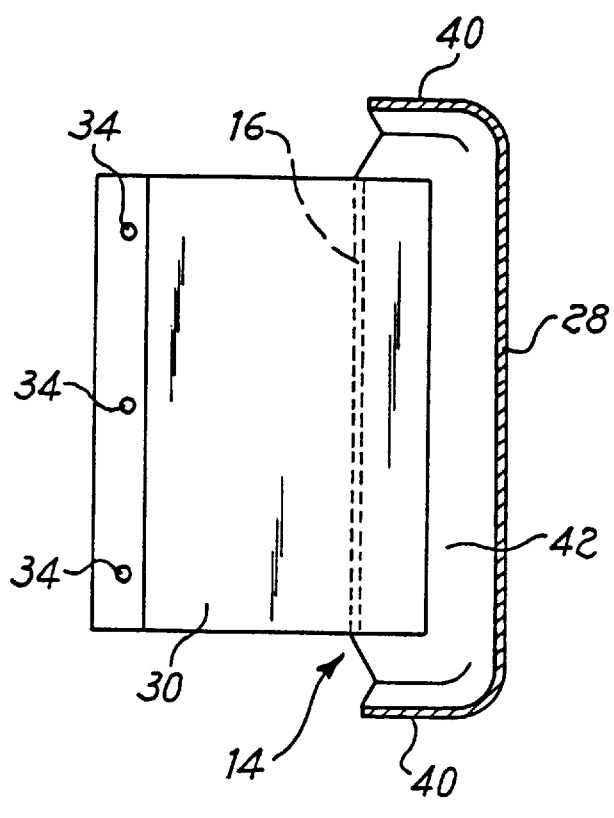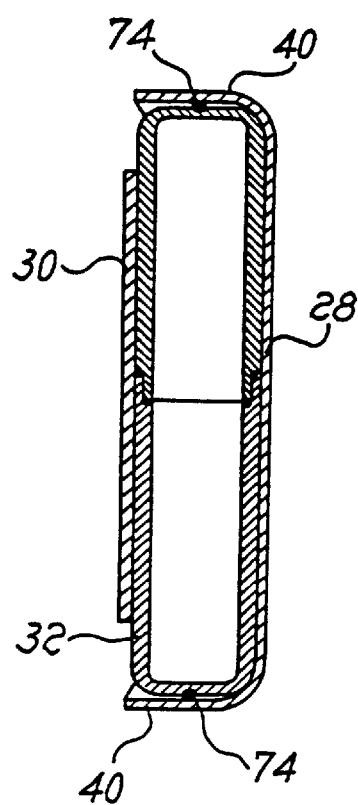

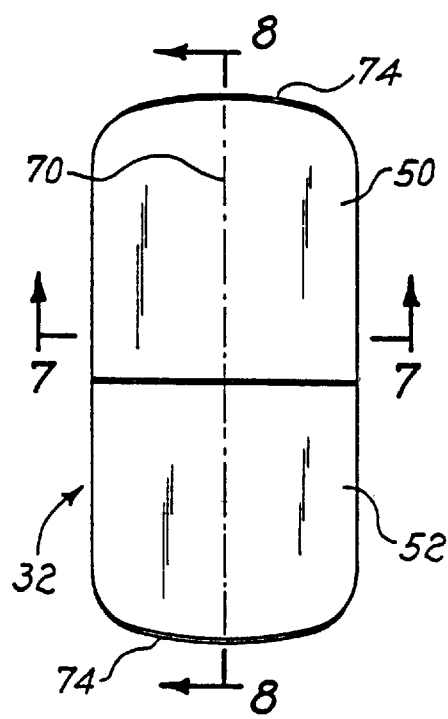
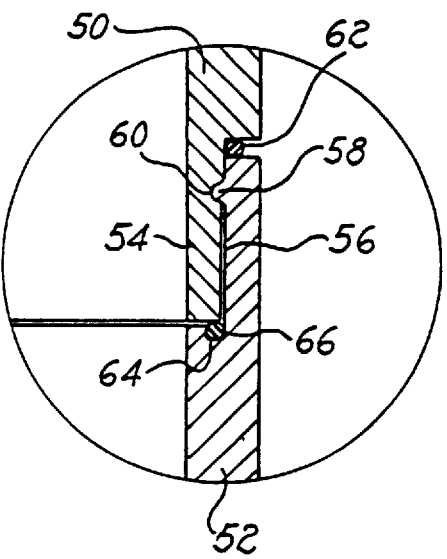
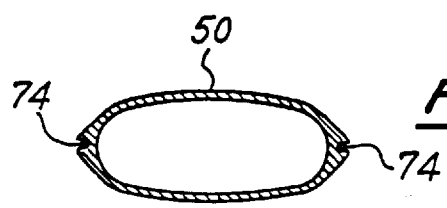
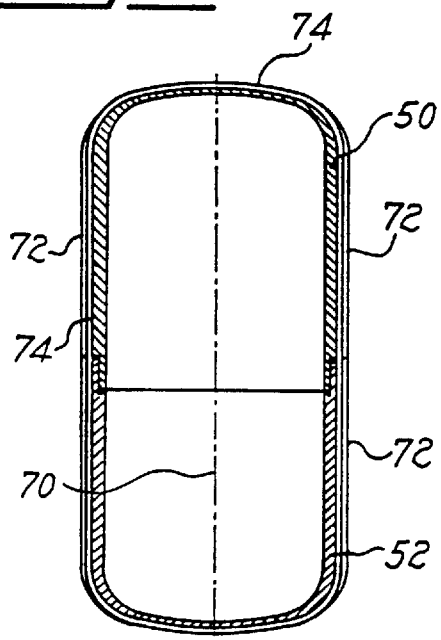
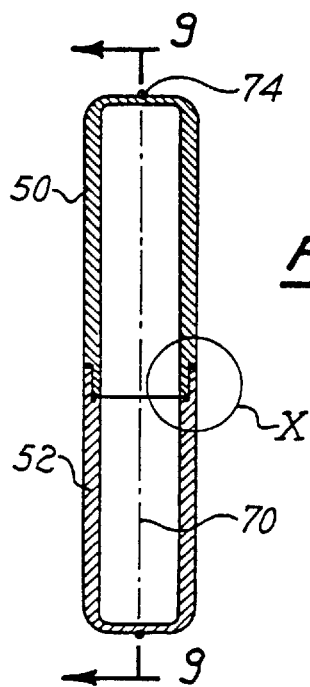

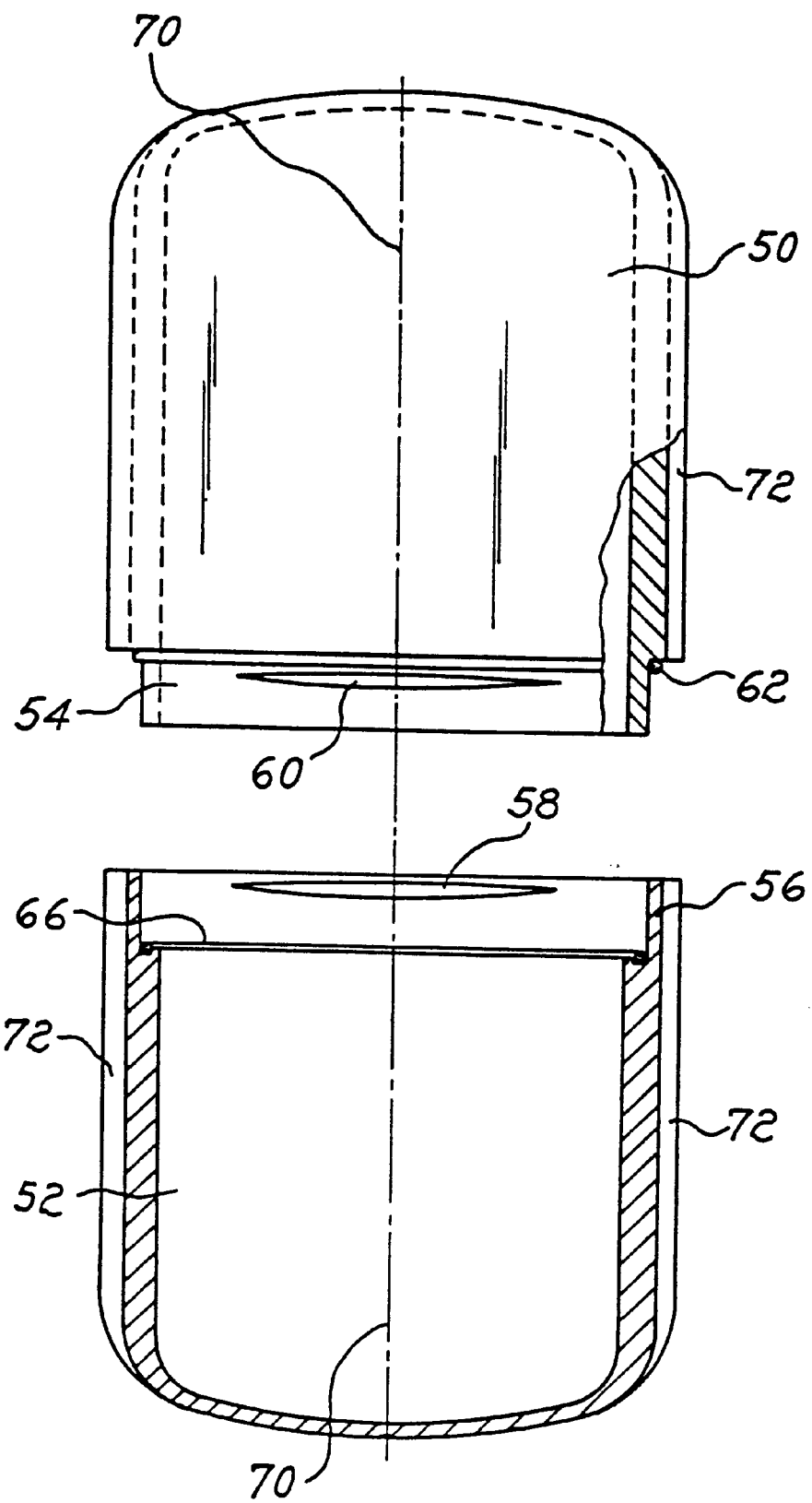

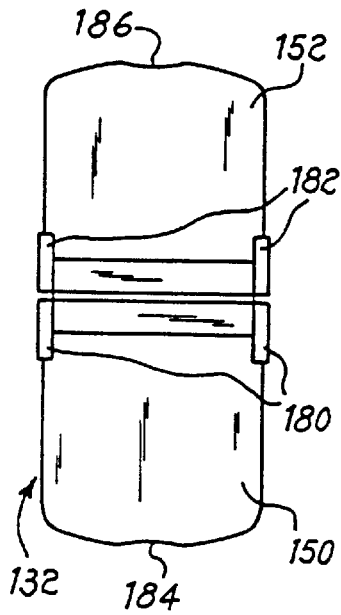
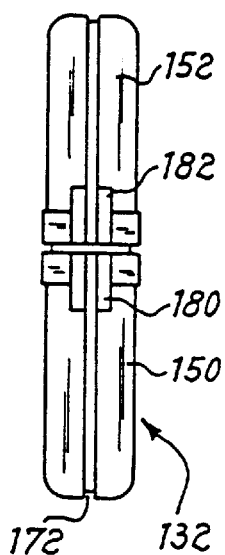
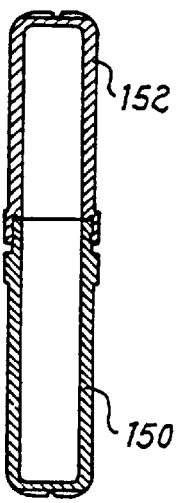
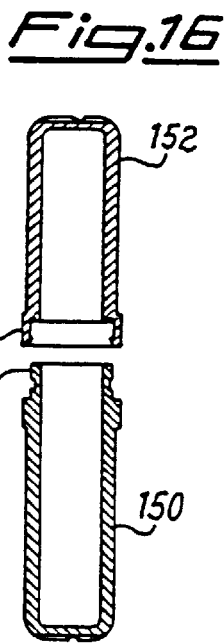
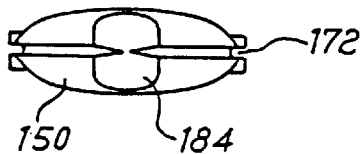
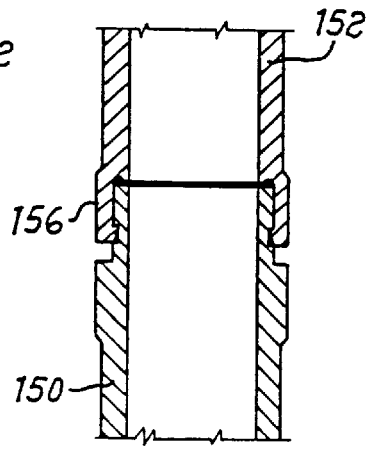
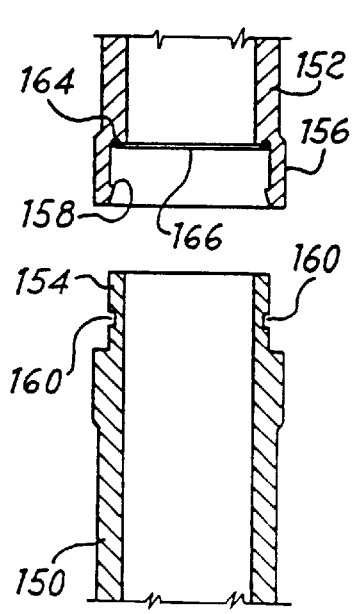
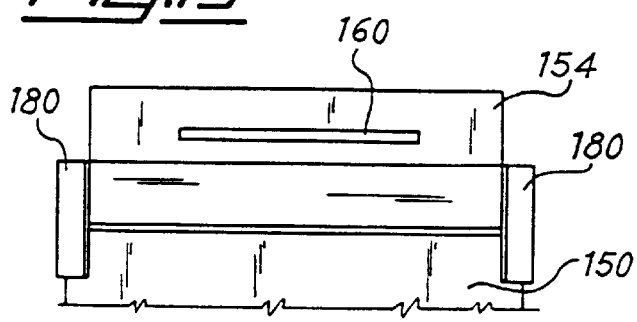

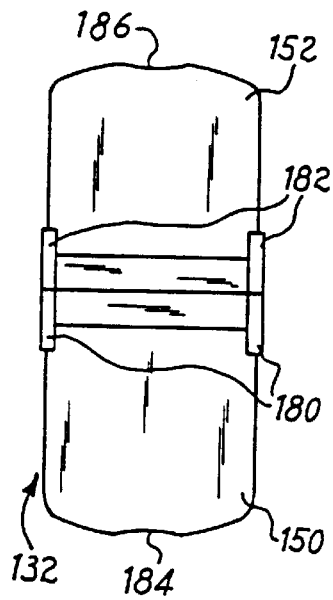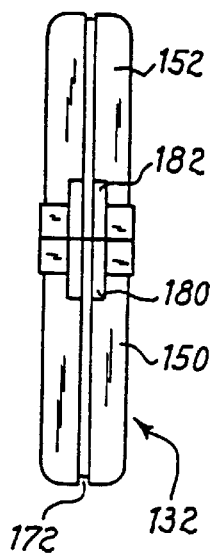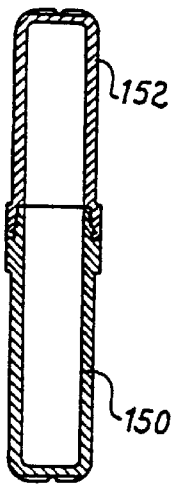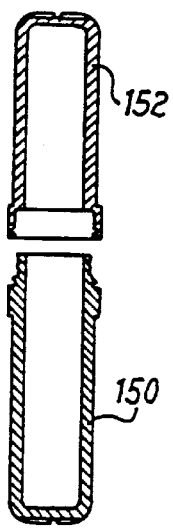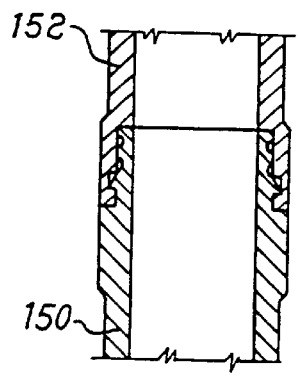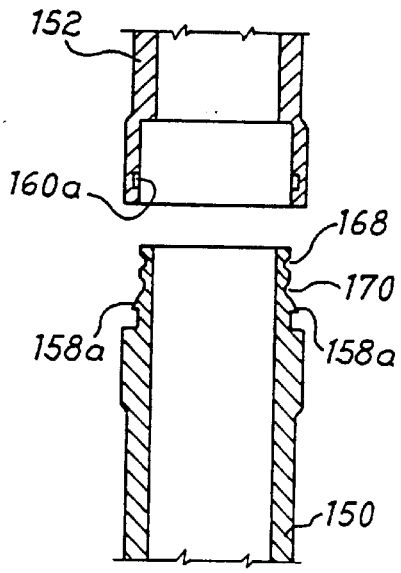

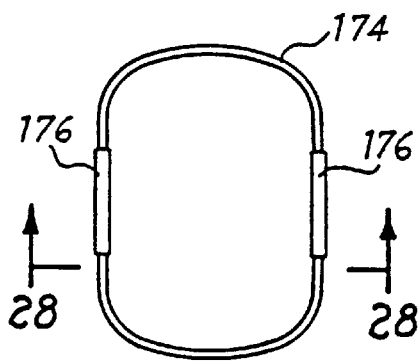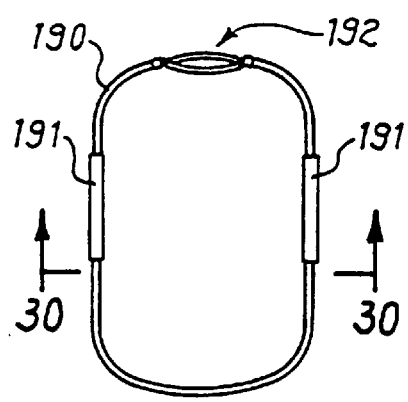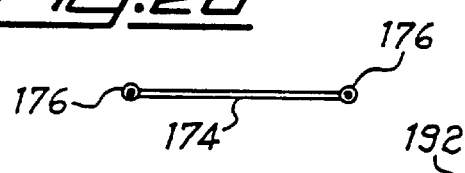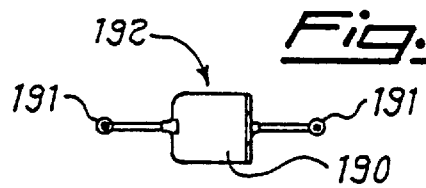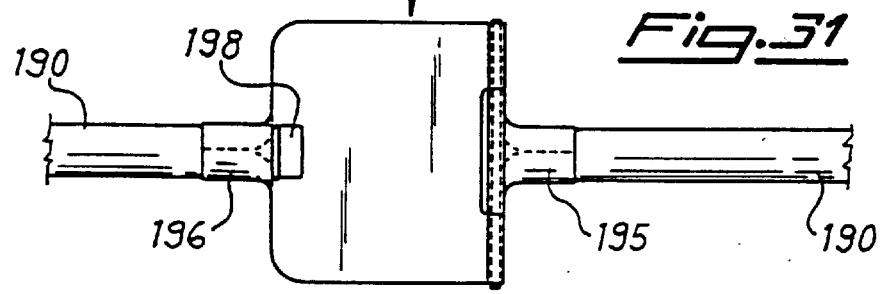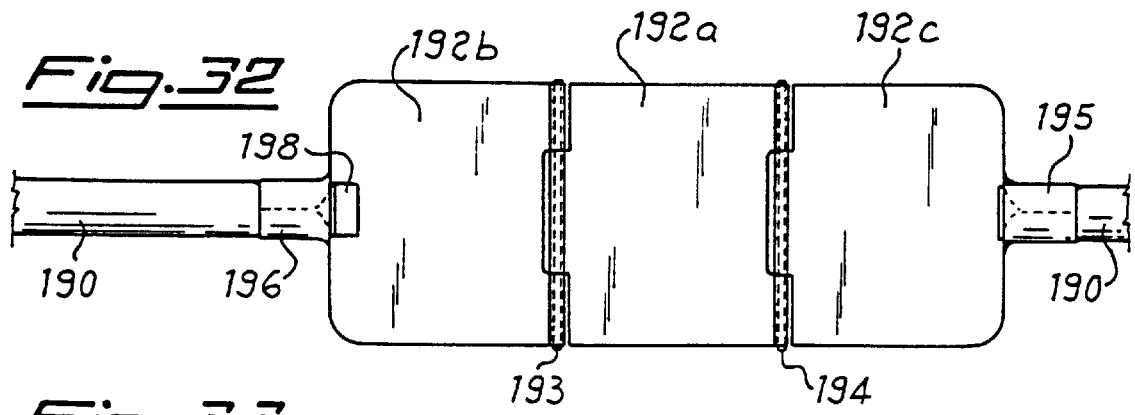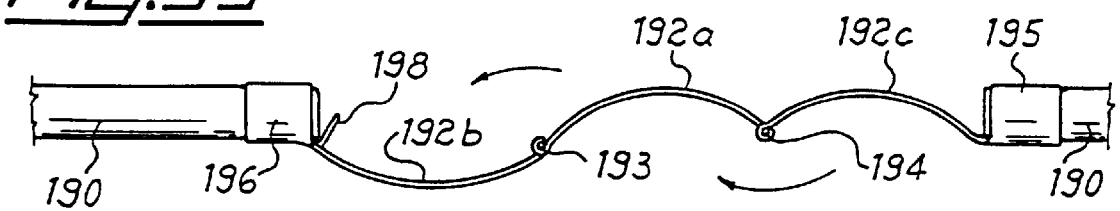

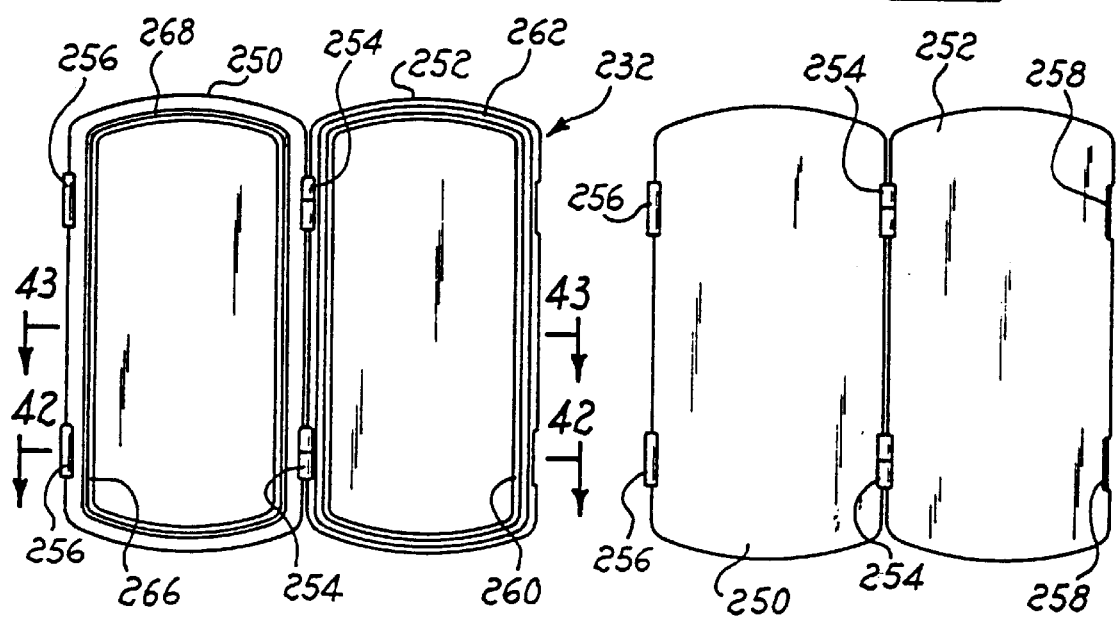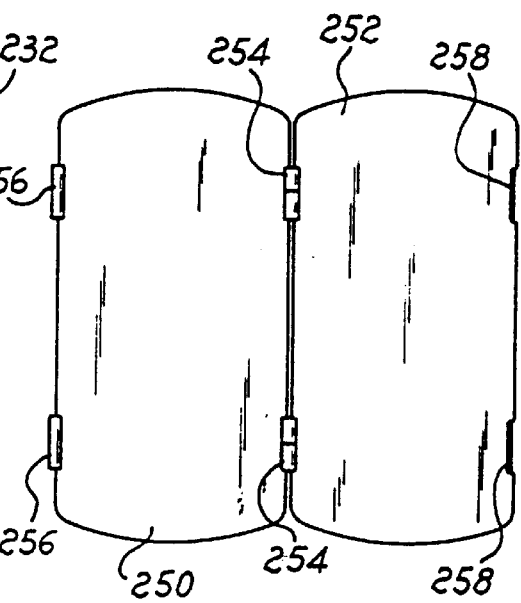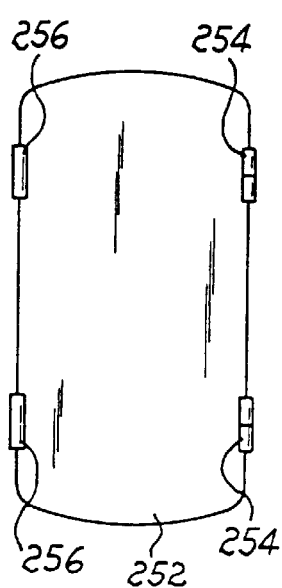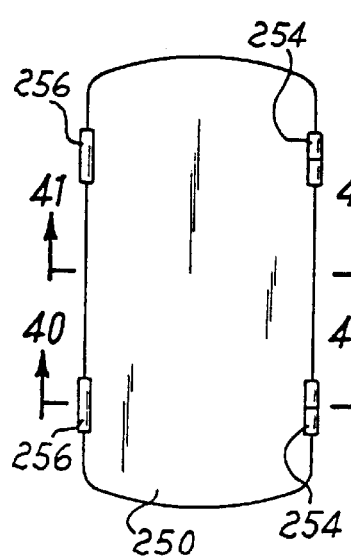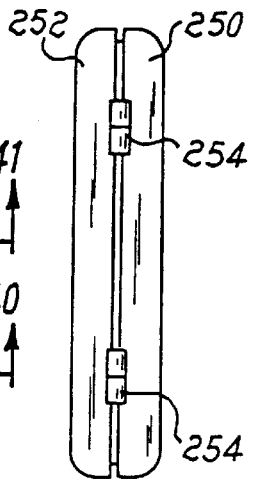

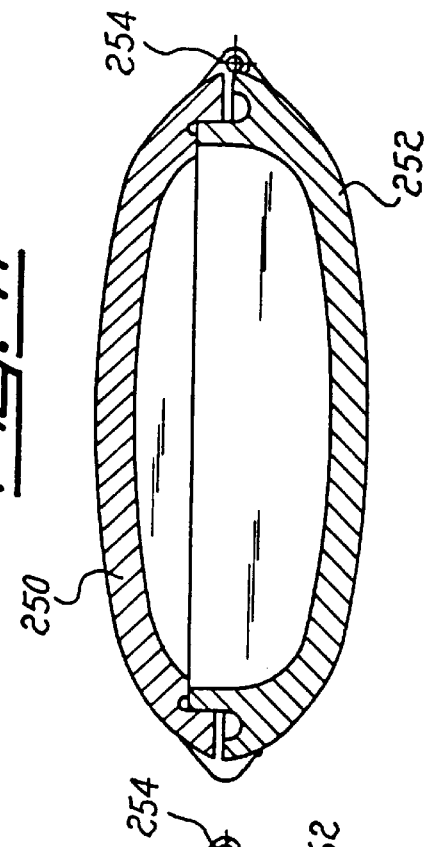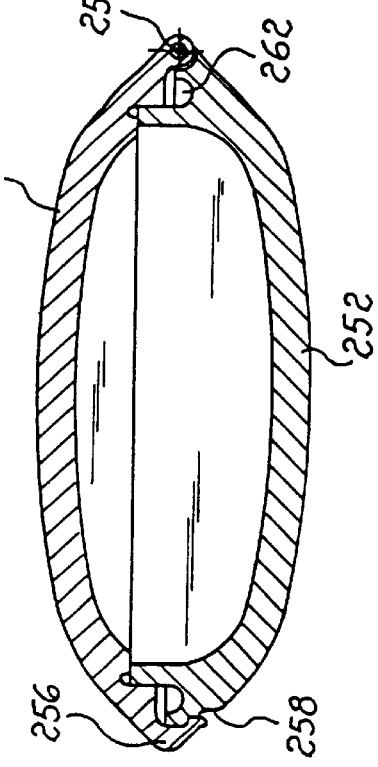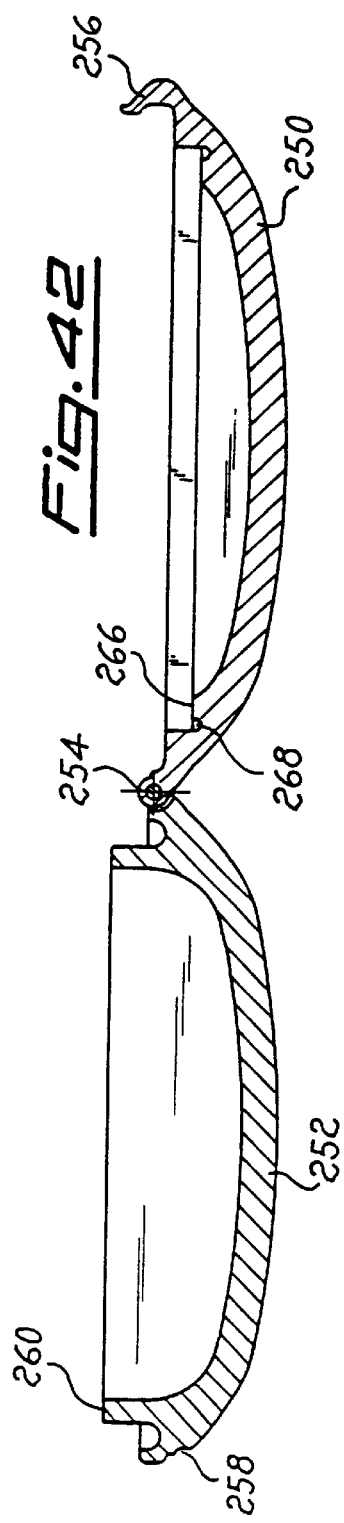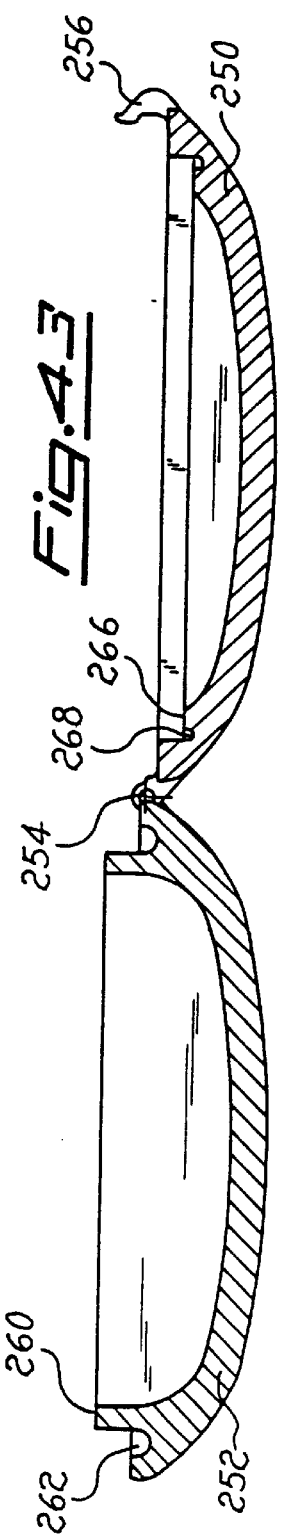

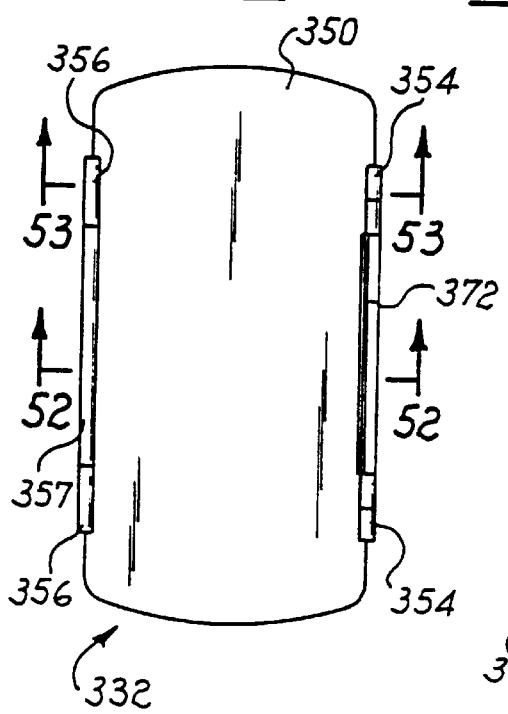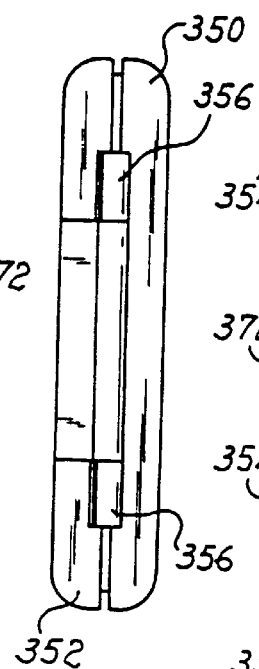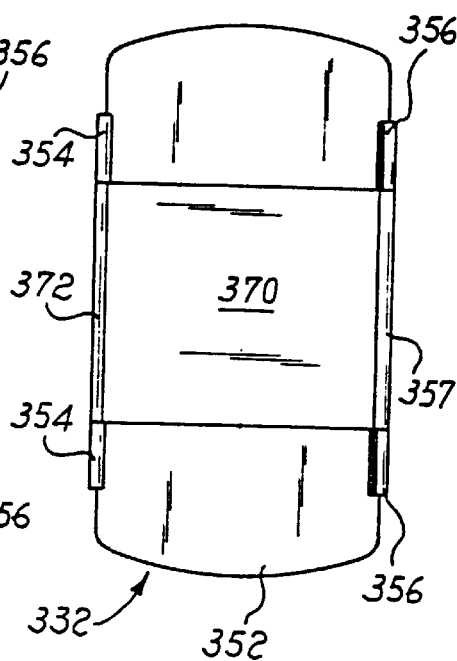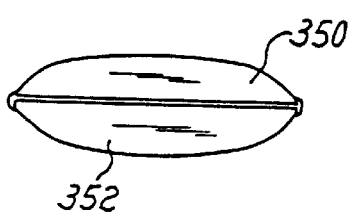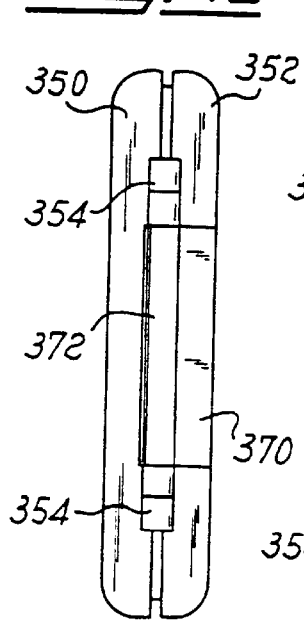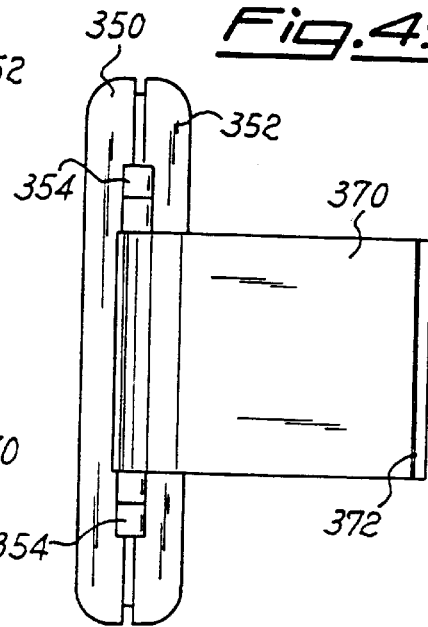

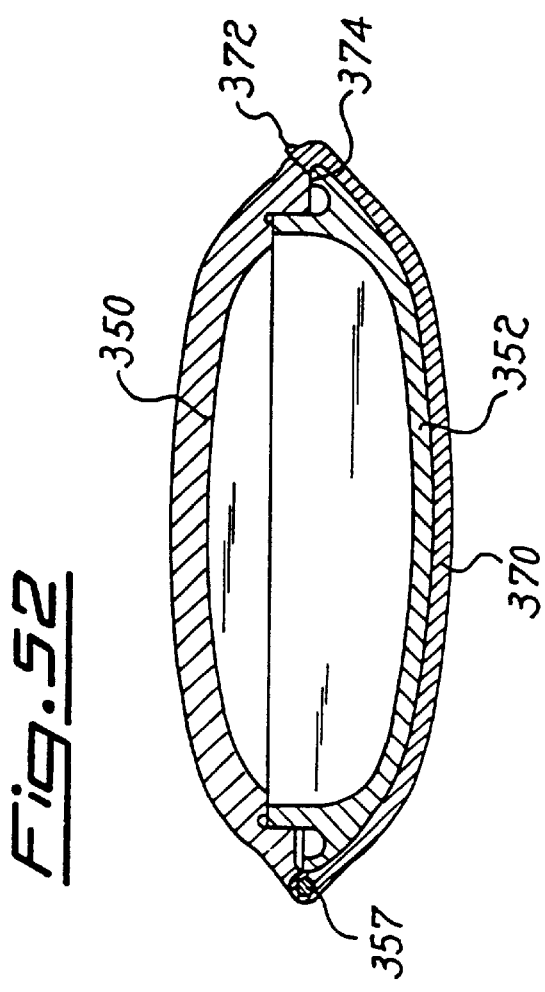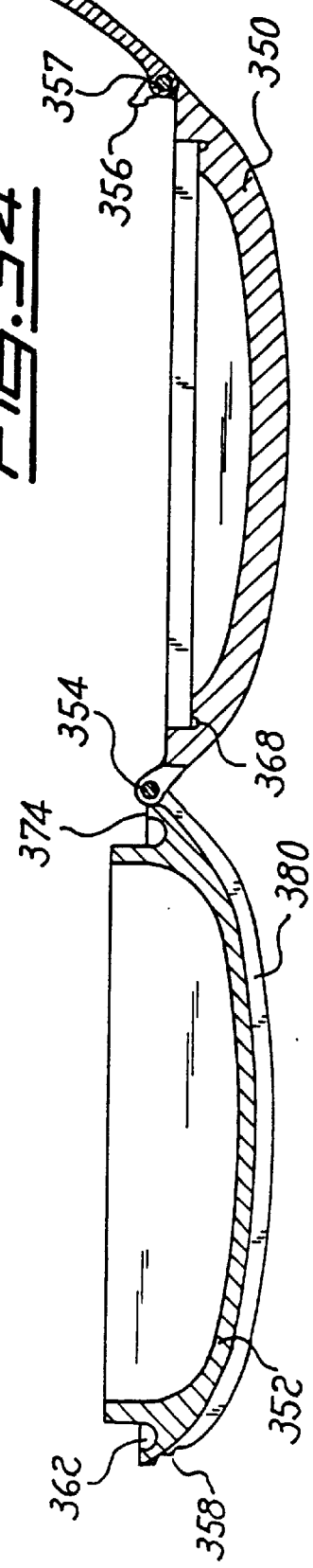

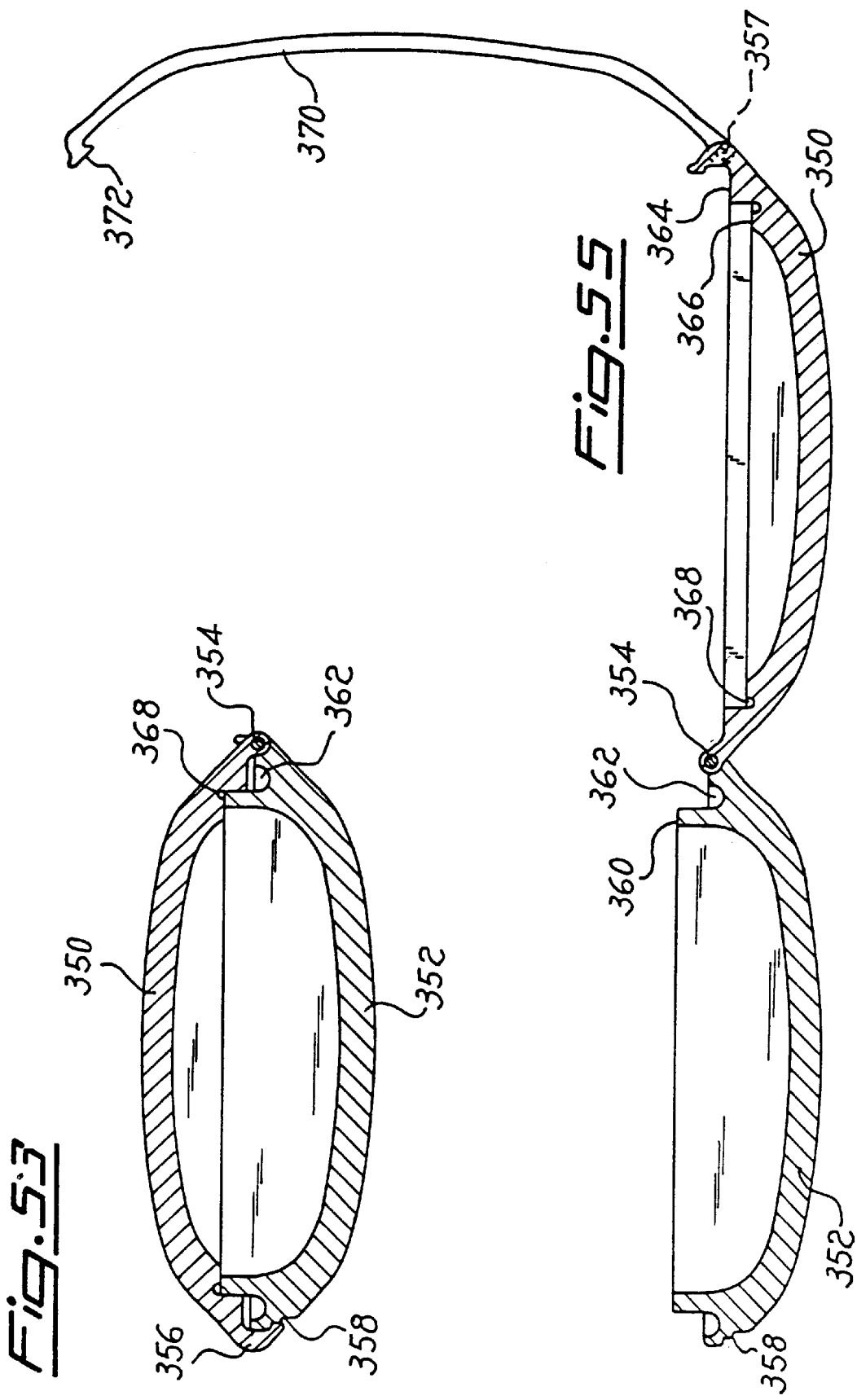

ARM LEG OR NECK WATERTIGHT CONTAINER, FOR HOUSING VALUABLES AND SMALL ARTICLES, SAFELY FASTENABLE TO HUMAN MEMBERS OR TO THE NECK OF DOGS AND OTHER DOMESTIC ANIMALS

The present invention concerns an article comprised of a watertight container to be fastened by means of a strap to limbs or other members or, like a collar, to the neck of domestic animals. The container is provided with a watertight closure and allows to give the article a shape of particularly flattened ellipsoidal cross-section, or the like, in order to result of little encumbrance in the use. The container is normally inserted in a suitable case or holder of the either belt or wrist strap enclosing it, allowing the carriage thereof, as it is strongly fastened to one of the members or to the neck of animals.

Such an invention is suited to solve carriage problems in outstandingly wet environments, such as swimming pools, sea and lake areas, or the like, of a plurality of small articles, and particularly money, which can need also in case of water immersion or bathing. Of course, such an article can be used also for carrying valuables or precious small size articles also in dry condition because the strong fastening and the location to be chosen on the body assure against bag-snatchings, pocket-pickings and robberies. It is suited also for the carriage of small precious articles, such as jewels or the like, as well as of necessary articles, such as pills to be swallowed at preset times independentely from the environment or location.

It is well known that for carrying banknotes or small articles in wet environments there are in trade some containers comprised of small tubes closed by a screw cap, abutting against a rubber O-ring gasket, and provided with a cord or string to be carried by the neck. Said containers have a decidedly modest safety and comfort rate because, being the tube cap screwed, it allows a nor perfectely even pressure against the O-ring gasket, as, owing to the angle of the screw thread, the cap does not evenly press the O-ring, so that the O-ring is more pressed in an area than in an opposed area and, consequentely, to have a sufficient seal on the whole gasket it is necessary to overpress an area thereof. Further, should by distraction the screw cap be not completely closed, the hermetic seal is lost, making useless the operation of the container. Moreover, a neckbearing does not prevent either pulling or slipping of the string, with consequent high danger of loss or theft, and not even allows to have the article and its contents under continuous watch. At last, the screw cap of the tubes imposes a cylindrical shape not very suitable to reduce the size with respect to the capacity of the container and does not allow any shape adjusting of the container itself.

Some documented attempts to solve, at least partially, the problems faced by the present invention are well known.

The document EP-A-0,432,635 relates to a wrist purse, which would be expected to be watertight, comprised of an oblong cup shaped container integrally molded with a wrist strap, the cup shaped container having a cover, connected as a book to the container itself and provided with a rounded protruding, edge engaged in a complementary edge of the container itself to provide an interference fitting, also trying to be watertight. The obtained results are how, are rather doubtful because, in spite to an attempt of carefully molding the cover and the container, there are some tolerances never allowing a complete seal. Further, the fact of using the same flexible material for molding the wrist strap, the container and the cover, does not make free the container and cover assembly from accidental strains, due to stresses, resulting in seal loss and poor practical utility of the article.

For example, the document CH-A-682,040 discloses an assembly of a wrist strap and a cup shaped container, provided with a sealed cover and particularly suited for housing watches, whose cover is fastened, by means of a suitable member, to a loop of the wrist strap. This approach has the main drawback due to the fact that the container provides the tasks of article both housing and hermetically sealing which, being provided by a not evenly pressed gasket, owing to a too short hinge between the cover and the container, cannot provide a perfect liquid seal. Further, as the duty to ensure the cover closure is provided by a bracket member fastened to a loop of the wrist strap, it happens that any accidental movement of the wrist strap can jeopardize the closure safety or efficiency of the bracket member itself. At last the circular cup shape of the container does not make it suitable for articles different from watches.

In addition to the above mentioned drawbacks, there is also the fact that the sealed cover is outside faced, so that the only force assuring its closure is due to the bracket member, which is poorly dependent from any engagement of the wrist strap with a limb of the user. It seems that the inventor, possibly worried to have the sealed cover of the container openable without disengaging the wrist strap from the limb of the user, avoided on purpose to inside face the cover, not realizing that such an inside facing could strongly enhance the closure and sealing of the cover itself due to abutment of the cover against the limb.

The document U.S. Pat. No. 4,566,616 discloses a container in the form of a rigid and resilient box, connectable to a housing or holder, in turn fastened to a watch wrist strap or belt. The system could operate rather well, however has two two main drawbacks. First, the rigid box, suited for containing articles, is provided with a cover of very doubtful sealing power, as for underwater uses the inventor relies chiefly on the presence of an air bubble into the box and it is possible to guess how little can help this air bubble in case of deep immersion or of upsettings due to uncontrolled movements. Second, the box is fastened to the housing just along a side through forced fitting means not able to ensure a safe fastening in case of violent moevements specially due to sport practice, so tat there is a risk of remotion of the box from the holder.

In addition to the above mentioned drawbacks, there is also the fact that the belt is intended for fastening the holder against a limb of the user but:

a) does not cooperate to fasten the rigid and more or less watertight container to the holder itself, as such a belt is just inserted in slots located near the bottom of the holder, so that the only operation permitted to the belt is to fasten the bottom of the holder against the limb of the user;

b) does not give any improvement to the closure and sealing of the container because does not cooperate in maintaining closed the poorly watertight cover which is exposed to any accidental stress tending to open it.

The above mentioned objects are met by a container according to the invention consisting of a rigid box inserted in a case or holder integral with a wrist strap, characterized in that the holder is as resilient as the wrist strap and substantially completely surrounds the box itself and is provided with an opening for the forced inlet of the box in the case or holder and the rigid box is comprised of two portions, partially each other fitted and tightly pressed by the resilient holder, surrounding the rigid box itself, provided with at least a sealing gasket interposed in the fitting area between the two portions, so that the resilience of the holder contributes in sealingly close the rigid box.

It is an object of the present invention to provide an absolutely watertight container whose seal is not affected by strains to an associated wrist strap.

Another object is to provide a container fastened by a wrist strap but removable therefrom.

Preferably, the holder integral with the wrist strap is comprised of an elastic or resilient shell which along a first side thereof appears as a thickened peripheral frame and along an opposed second side appears as a frame surrounding an opening closed by a substantially rectangular flap hinged along a side to the frame itself and countable along an opposed side to the frame by means of holes receiving corresponding pins of the frame.

Particularly, the first side of the shell is the external one and the second side of the shell is the internal one.

In a second alternative, the pins could be on the side of the flap and the holes on the side of the frame.

In a third alternative, instead of pins and corresponding holes, could be used snap fasteners.

In a fourth alternative, could be used a fabric strip on a side and a Velcrum$^R$ on an opposite side, each other engaged.

In a fifth alternative, could be used a ridge on a side and a slot on an opposite side, each other engaged.

In a sixth alternative, could be used a zip fastener.

Also preferably, the rigid closure or box, having substantially elliptical cross-section, is transversally divided in two portions of substantially equal length, being a first portion thereof provided with an area having externally thin walls and axially extending, to be inserted in an enlarged opening of the second portion formed through inside reduction of the walls thereof, suited to house the thin wall area of the first portion, housing on the bottom a first resilient sealing gasket engageable with the basis of the first portion.

More preferably, the thin wall area of the first portion houses, at the border with the thick walls, a second resilient sealing gasket engageable with one of the basis faces of the second portion.

Alternatively, the thin wall area of the first portion is provided on the lateral external lateral wall, with two parallel slots suited to house two paired gaskets. Particularly, the gaskets housed in the two portions of the rigid box are two rubber O-ring gaskets.

In addition, an internally reduced wall area of the second portion is provided with at least a protruding ridge suited to be engaged in a corresponding slot of the externally reduced wall of the first portion.

Preferably, the protruding ridges of the second portion and the slots of the first portion are two in number arranged on opposed walls.

Alternatively, the two portions forming the rigid box are quite each other different in size, being a portion of greater length and the other portion of lesser length.

In addition, the rigid box is provided with a peripheral slot suited to house a rubber gasket operating as a further closing elastic means.

Preferably, the gasket is an O-ring gasket having length of the internal perimeter a little less than the external perimeter of the box.

In addition, the O-ring gasket is provided with two lateral stiffening means insertable in areas of the peripheral slot, adjacent to the joining area of the two portions of the rigid box and reinforced through thickening, in order to prevent flexural strains in such an area.

Preferably, the stiffening means are two small metal tubes obtained by winding a laminate sheet about the corresponding areas of the gasket.

Alternatively, the gasket, preferably an O-ring, surrounding the rigid box, can be replaced by a flexible, though inextendible, member provided with a buckle comprising a lever and a coupling.

According to a different and alternative embodiment, the box, instead to consists of two each other axially insertable portions, is formed by two each other hinged portions, similar to a snuff-box, provided with reciprocal coupling means, ensuring a safe closure of the box, and at least a gasket for the seal between the two portions of the box.

Preferably, the sealing gaskets between the two portions of the box are two in number.

Particularly, the reciprocal coupling means of the box are two hook tangs overriding an edge of a half of the rigid box.

In addition, the reciprocal coupling means of the box are supplemented by a flap completely surrounding a half of the box and overriding an edge thereof.

The features of the invention will be particularly and precisely defined in the appended claims forming the conclusive portion of the present description. However, other features and advantages thereof will result selfevident from the following detailed description of some embodiments, given in an examplifying and not limiting way, provided with the enclosed drawings, in which:

FIG. 1 is a complete top view of a container according to the present invention;

FIG. 2 is a cross-section view taken along the line 2—2 of FIG. 1, with the closing flap of the external holder held open;

FIG. 3 is the same view of FIG. 2 with closed flap;

FIG. 4 is a partial view in cross-section of the external holder particularly emphasizing the closing flap;

FIG. 5 is a cross-section view, taken along the line 5—5 of FIG. 3, with the flap held closed;

FIG. 6 is an external view of a first embodiment of a rigid and hermetic box according to the present invention, FIG. 7 is a cross-section view taken along the line 7—7 of FIG. 6;

FIG. 8 is a cross-section view taken along the line 8—8 of FIG. 6;

FIG. 9 is a cross-section view taken along the line 9—9 of FIG. 8;

FIG. 10 is an enlarged view of a detail indicated by the letter X in figures;

FIG. 11 is an exploded view partially in cross-section, of the same rigid and hermetic box;

FIG. 12 is an external front view of a second embodiment of a rigid and hermetic box according to the present invention;

FIG. 13 is a lateral view of the rigid and hermetic box depicted in FIG. 12;

FIG. 14 is an end view of the same rigid and hermetic box depicted in FIG. 12;

FIG. 15 is a longitudinal cross-section view of the same rigid and hermetic box of FIG. 12 in the closed state;

FIG. 16 is a longitudinal cross-section view of the same rigid and hermetic box of FIG. 12 in the open state;

FIG. 17 is a partial enlarged view of detail of FIG. 15 showing the insertion of a male portion of the rigid box in a corresponding female portion thereof in the closed state;

FIG. 18 is a partial enlarged view of a detail of FIG. 16 showing a separation of the insertable male portion of the rigid box into a corresponding female portion thereof in the open state;

FIG. 19 is a partial external view of the particular male coupling of the rigid box of FIG. 12;

FIG. 20 is an external front view of a third embodiment of a rigid and hermetic box according to the present invention;

FIG. 21 is a lateral view of the rigid and hermetic box depicted in FIG. 20;

FIG. 22 is a longitudinal cross-section of the same rigid hermetic box of FIG. 20 in closed state;

FIG. 23 is a longitudinal cross-section of the same rigid hermetic box of FIG. 20 in open state;

FIG. 24 is a partial enlarged view of a detail of FIG. 22 showing the insertion of a male portion of the rigid box in a corresponding female portion in the closed state;

FIG. 25 is a partial enlarged view of a detail of FIG. 23 showing the position prior to insertion of a male portion of the rigid box into a corresponding female portion in the open state;

FIG. 26 is a partial external view of the particular male coupling of the rigid box of FIG. 20;

FIG. 27 is a schematic front view of a resilient member, similar to the O-ring gasket 74 closing the rigid box of the first embodiment of the invention to be applied to the rigid boxes of the second and third embodiment, mainly depicted in the respective FIGS. 12 and 20;

FIG. 28 is a cross-section view taken along the line 28—28 of FIG. 27;

FIG. 29 is a schematic front view of an alternative closing member consisting of a flexible, though substantially inextendible wire, provided with a buckle comprising a lever and a coupling;

FIG. 30 is a cross-section view taken along the line 30—30 of FIG. 29;

FIG. 31 is an enlarged view of the closing buckle of the member of FIG. 29 depicted in closed state;

FIG. 32 is an enlarged view of the closing buckle of the member of FIG. 29 depicted in open state;

FIG. 33 is a lateral enlarged view of the closing buckle of the member of FIG. 29 depicted in open state;

FIG. 34 depicts an open top view of a fourth embodiment of a rigid hermetic box according to the invention consisting of two longitudinally separated half boxes connected along a longer side by hinges and provided on the opposed side of coupling closure means;

FIG. 35 depicts an open bottom view of the same fourth embodiment of rigid hermetic box according to the invention;

FIG. 36 depicts a closed top view of the same fourth embodiment of rigid hermetic box according to the invention;

FIG. 37 depicts a closed bottom view of the same fourth embodiment of rigid hermetic box according to the invention;

FIG. 38 depicts a closed lateral view, on the hinge side, of the embodiment of rigid hermetic box of FIG. 36;

FIG. 39 depicts a closed lateral view, on the coupling means side, of the embodiment of rigid hermetic box of FIG. 36;

FIG. 40 is an enlarged cross-section view or the closed box of FIGS. 36 and 37 taken along the line 40—40 of FIG. 37;

FIG. 41 is an enlarged cross-section view of the closed box of FIGS. 36 and 37 taken along the line 41—41 of FIG. 37;

FIG. 42 is an enlarged cross-section view of the open box of FIGS. 34 and 35 taken along the line 42—42 of FIG. 34;

FIG. 43 is an enlarged cross-section view of the open box of FIGS. 34 and 35 taken along the line 43—43 of FIG. 34;

FIG. 44 is a closed top views of a rigid hermetic box according to a fifth embodiment of the invention;

FIG. 45 is a closed end view of the same box according to the fifth embodiment of the invention;

FIG. 46 is a closed bottom vie of the box according to the fifth embodiment of the invention;

FIG. 47 is a closed view, along the hinge side, of the box according to the fifth embodiment of the invention;

FIG. 48 is a closed view, along the closure coupling means side, of the box according to the fifth embodiment of the invention;

FIG. 49 is view, along the same side of FIG. 48, showing a closure flap which is disengaged to begin the opening;

FIG. 52 is an enlarged cross-section view of the closed box according to the fifth embodiment of the invention taken along the line 52—52 of FIG. 44;

FIG. 53 is an enlarged cross-section view of the closed box according to the fifth embodiment of the invention taken along the line 53—53 of FIG. 44;

FIG. 54 is an enlarged cross-section view of the open box according to the fifth embodiment of the invention taken along the line 54—54; of FIG. 50; and FIG. 55 is an enlarged cross-section view of the open box according to the fifth embodiment of the invention taken along the line 55—55 of FIG. 50.

Figure 50:
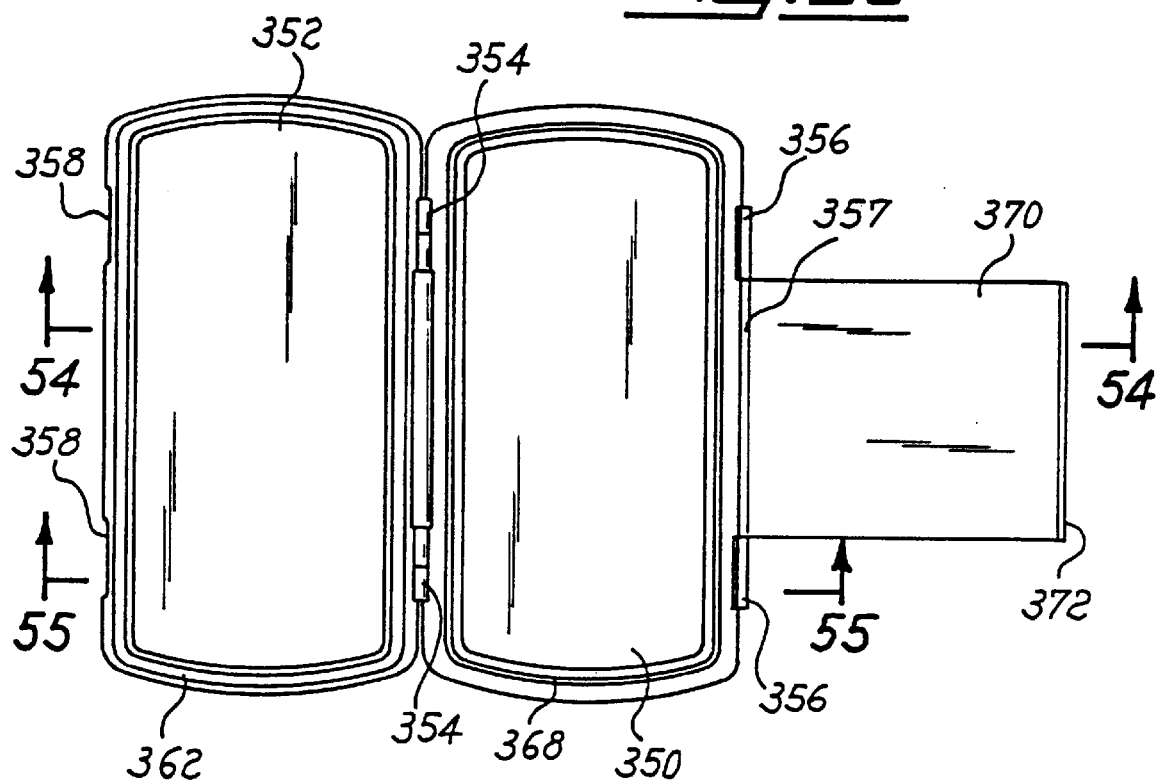
FIG. 50 is an open top view of a rigid hermetic box according to the fifth embodiment of the invention.

Referring to FIGS. 1 to 5, it is seen that a container 10 according to the present invention consists of a wrist strap 12, connected to a hollow case or holder 14, and comprising a left strap portion 16, provided with a buckle 18 and bridges 20 and 22, and a right strap portion 24 provided with a hole line 26 suited for engaging the buckle 18 present at the end of the left strap portion 16 and suited for slipping into the already mentioned bridges 20 and 22.

The hollow holder 14 comprises an external covering portion 28 ending with an internal flap 30, defining the recess of the holder 14 itself suited to hold inside a rigid watertight box 32, and provided with holes 34, engageable by pins or similar protrusions 36 coming out from an edge 38 of the covering portion 28 faced against the external end of the flap 30. As particularly visible in FIG. 4, the external covering portion 28 comprises two head areas 40 connected by a side wall 42 to which is fastened the flap 30 provided with the fastening holes 34. The head areas 40 cooperate with side walls, such as the wall 42 shown in FIG. 4, to form the external covering portion 28 housing in its recess the rigid watertight box 32.

As particularly visible in FIG. 5, the rigid watertight box 32 is closed on all its faces by the external covering portion 28 contributing to prevent any accidental opening.

Considering in the whole the FIGS. 1 to 5, it is seen that the rigid watertight box 32 can be easily inserted in the recess of the covering portion 28 when the flap 30 is pushed aside, leaving a free entry to the recess itself. Once the box 32 has been housed, it is sufficient to close the flap 30 engaging the holes 34 in the pins or protrusions 36 of the edge 38 for obtaining a safe fastening of the box 32 to the strap 12. An clamping of the strap 12 to a limb further contributes to fasten the box to the strap because the pressures due to the clamping of the strap 12 push the box 32 against the covering portion 28, relieving, at least partially, the flap 30 of the duty of fastening the box 32.

Referring now to FIGS. 6 to 11, it is completely understood how the rigid watertight box 32 is made. This box 32 is comprised of two hollow shells 50 and 52, of which a first shell 50 depicted, upside depicted, is provided with a sleeve extension 54, having an external wall reduction, suited to be inserted into a corresponding seat 56 housed in the second shell 52, having an internal wall reduction. Of course, the sleeve extension 54 slips with some precision into the seat 56 and further, for ensuring a forced holding of the sleeve 54 in the seat 56, the internal wall of the seat 56 having a protruding ridge 58 engaged in a corresponding slot 60 present in the lateral wall of the sleeve 54 itself. At the border of the sleeve 54 with the external wall of the shell 50 is housed a first O-ring gasket 62 remaining there confined when the box 32 is closed, providing a first hermetic seal area. A slot 64 at the basis of the seat 56 houses a second O-ring gasket 66, also there confined, providing a second hermetic seal area.

It is easily understood that, as all the stresses interesting the rigid watertight box 32 are directed in a way substantially perpendicular with respect to the longitudinal axis 70 thereof, do not substantially exist forces able to remorse the sleeve 54 from the seat 56, as the protruding ridges 58 on opposite walls of the sleeve 54 of the shell 50 prevent a separation of the shells, unless a pressure is applied to the shell 50 to remove the slots 60 from the ridges 58 of the shell 52 and are pulled on purpose the two shells 50 and 52, by reciprocal remotion, to open the box 32.

In addition, it is possible to add a safety clamping means, contributing to each other join the shells 50 and 52, in the form of a peripheral slot 72 suited to house a resilient member acting by pulling, as for example all O-ring gasket 74 which, having the length of the internal perimeter a little shorter of the external perimeter of the slot 72, further contibutes to close the box 32.

The use and the operation of the watertight container according to the present invention is of simple explanation.

When some article is to be inserted in the rigid and watertight box 32, it is removed from the recess of the holder 14, by simply opening the flap 30 through disengagement of its holes 34 from the protrusions 36 of the edge 38 and forcefully extracting the box 32 in order to overcome the constraints imposed by the holder 14, which is of resilient material (for example an elastomer). Once the box 32 has been extracted from the recess of the holder 14, it can be opened by reciprocally removing the two shells 50 and 52. In the open box are inserted the articles to be protected and then it is reclosed by simply joining the two shells 50 and 52 till the ridges 58 come into the slots 60, determining the definite snap—closure of the box 32 itself. The closure of the box 32 can be further ensured by inserting an elastic band, in the form of an O-ring gasket 74, in the peripheral slot 72 of the box 32 itself. The presently closed box 32 is reinserted in the recess of the case 14, connecting the box 32 to the strap 12 and thus obtaining the whole complete container 10 ready to be fastened to a body limb or member. Of course, for extracting something from the box 32 born by the strap 12, it is proceeded through an operation logically reversed with respect to the one here above disclosed.

Figure 51:
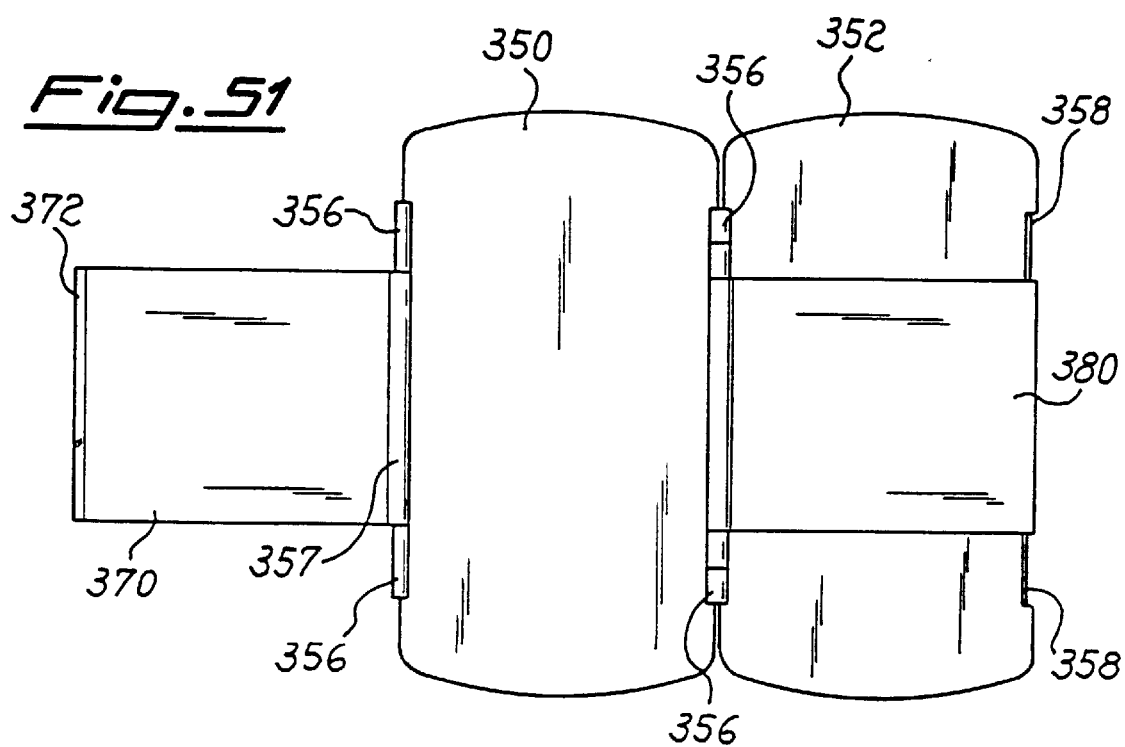
FIG. 51 is an open bottom view of the same rigid hermetic box according to the fifth embodiment of the invention.

Reference is made to the FIGS. 12 to 55 relating to different variations in the embodiment of the rigid and watertight box indicated as a whole and in its components, where applicable, by the same above given numerals, preceded by the respective numerals 1, 2, 3, etc. . .

A first variation of box 132 is depicted in the FIGS. 12; to 19. This rigid watertight box 132 is comprised of two hollow shells 150 and 152 of which a first shell 150, downward depicted, is provided with a sleeve extension 154, having an external wall reduction, suited to be inserted in a corresponding seat 156 located in the second shell 152, having an internal wall reduction. Of course, the sleeve extension 154 slips with some precision into the seat 156 and further, to ensure a forced restraint of the sleeve 154 in the seat 156, the internal wall of the seat 156 is provided with one or more protruding ridges 158 engaged in one or more corresponding slots 160 in the side walls of the sleeve 154 itself. A slot 164 at the basis of the seat 156 houses an O-ring gasket 166, there restricted, providing a hermetic seal area. This box 132, differently from the box 32 depicted in FIGS. 6 to 11, has about the peripheral slot 172, corresponding to the slot 72 of the box 32, some thickened areas 180, 182 suited to house specific stiffening means of an elastic band, or similar string, to be slipped in the peripheral slot 172, as it will be explained referring to the FIGS. 27 to 33. It is to remark that the two shells 150 and 152 have at their poles depressions 184 and 186, respectively, as deep as the peripheral slot 172, having the selfevident purpose of helping the remotion of an elastic band or gasket possibly located in the slot 172.

Reference is made to the FIGS. 20 to 26 depicting a third embodiment of rigid and hermetic box according to the invention. This third embodiment of rigid and hermetic box is very similar to the second embodiment from which differs just because, instead to have in the shell 152 only a slot 164 suited to house an O-ring gasket 166 at the basis of the seat 156, has two parallel slots 168 and 170 on the sleeve 154 of the shell 150 and, on the same sleeve 154, one or more protruding ridges 158a engaged in one or more slots 160a in the seat 156 o the shell 152. Of course, the two parallel slots 168 and 170 house two O-ring gaskets (not shown). Also the third embodiment of FIGS. 20 to 26 is provided with the same thickened areas 180 and 182 appearing in the second embodiment and having the same purpose. All the other components of the third embodiment of the invention are indicated by the same numerals of the components of the second embodiment because they are structurally and operatively identical or similar.

In the FIGS. 27 and 28 is depicted a string 174 in the form of an elastic gasket, as an O-ring, provided with two small stiffening tubes 176 so arranged to be inserted in the slot 172 of the shells 150 and 152 just between the thickened areas 180 and 182, to provide a stiffening of the junction point of the two shells 150 and 152 to prevent any accidental separation owing to flexion between said two shells. Preferably, the two stiffening tubes 176 are applied on an O-ring gasket by winding two cylinder shaped laminations. These laminations can be of any rigid material deformable through winding, such as plastic or metallic sheets. Metal alloys particularly preferred for this purpose are stainless steels of common use in the industry.

An alternative string is depicted in the FIGS. 29 to 33. This string consists of a simple flexible, though inextendible wire or braid 190 which can be of plastic material, but is preferrred in a metallic alloy, such as stainless steel, for selfevident unalterability reasons. Analogously to the elastic string 174, also the wire or braid 190 is provided with two stiffeninig tubes 191 made in the same way and of the same material of the stiffening tubes 176 of the string 174. For clamping the string 190, which by nature is inextendible, is used a clamping buckle 192 similar to some buckles used for clamping metal loop watch straps. This clamping buckle 192 is shown completely closed in the FIG. 31 and completely open in the FIGS. 32 and 33, where is depicted in a top and a side view, respectively. The buckle 192 is connected to the string 190 by means of two crimped areas 195 and 196 and consits of three joined members 192a, 192b and 192c each other connected by hinges 193 and 194, to allow unclamping and clamping of the, buckle 192, and the member 192b is provided with a finger 198 for allowing the lock of the buckle 192, once clamped, as depicted in FIG. 31.

Reference is made to FIGS. 34 to 43 concerning a fourth embodiment of the invention comprising a rigid watertight box 232 formed by two half boxes 250 and 252, connected by two hinges 254, to form a box similar to a snuff-box. The half box 250 is provided with two resilient hooks 256, engageable in corresponding seats 258 in the half box 252, for providing the closure of the box 232 itself.

The half box 252 is provided with a sleeve 260 connected by a semicylindric slot 262 to the box body. Of course, this slot 262 is suited to house a seal gasket which is pressed by an external plane 264 of the half box 250, which box is also provided with an internal plane 266 delimitating a slot 268 suited to house a seal gasket pressed by the top area of the sleeve 260. It is understood that such a system of double gaskets, housed in respective slots 262 and 268, allows an absolutely hermetic seal of the box 232, once it has been closed.

Reference is made to the FIGS. 44 to 55 concerning a fifth embodiment of the invention comprising a rigid and watertight 332 formed by two half boxes 350 and 352, connected by two hinges 354, to form a box similar to a snuff-box. The half box 350 is provided with two resilient hooks 356, engageable in corresponding seats 358 in the half box 352, for providing to the closure of the box 332 itself.

The half box 352 is provided with a sleeve 360 connected by means of a halfcylindric slot 362 to the box body. Of course, this slot 362 is suited to house a seal gasket which is pressed by an external plane 364 of the half box 350, which half box is also provided with an internal plane 366 delimitating a slot 368 suited to house a seal gasket pressed by the top of the sleeve 360. It is meant that such a system of double gaskets, housed in the respective slots 362 and 368, allows an absolutely hermetic seal of the box 332, once it is closed.

This fifth embodiment of rigid watertight box 332 is moreover provided with a further safety closure system consisting of a flap 370 surrounding, in closed position, the lower half box 352. This flap 370 is connected by means a hinge 357 and is coupled to the half box 352 by means of a hook 372 engaging an external edge 374 of the half box 352. In order not to go out of size from the lower half box 352, the flap 370 is housed in a lowered area 380 in the external wall of the half box 352 itself.

What has been hereabove described and depicted are just some embodiments of the present invention not to be meant in limiting way. Indeed those skilled in the art can devise, from the reading to the hereabove disclosed description, logically equivalent variations and changements to be held covered by the appended claims.

What is claimed is:

1. A watertight container, fastenable to a body part, comprising a rigid watertight box (32, 132) removably positioned in a resilient case or resilient holder, said holder having an (14) integral resilient wrist strap (12), said holder (14) being as resilient as the wrist strap (12) and being provided with an opening for a forced inlet of the box (32, 132) into the resilient case or said resilient holder (14), said resilient holder engagingly conforming to the exterior of said rigid box to retain said box in said holder, and said rigid box (32, 132) being comprised of two telescoping portions (50, 150, 52, 152) rectangular in shape, each partially fitted with each other and defining a fitting area between said two portions and tightly pressed by the resilient holder (14), said rigid box being provided with at least a sealing gasket (62) interposed in the fitting area and enclosed between the two portions (50, 150, 52, 152), so that the resilience of the resilient holder (14) contributes in sealingly closing the rigid box (32, 132) and snapping coupling means (58, 158, 158a, 60, 160), for engaging the two portions (50, 150, 52, 152) of the rigid box (32, 132), said gasket being external of said snapping coupling means.

2. A watertight container, fastenable to a body part, comprising a rigid watertight box (32) removably positioned in a resilient case or resilient holder, said holder having an (14) integral resilient wrist strap (12), said holder (14) being as resilient as the wrist strap (12) and being provided with an opening for a forced inlet of the box (32, 132) into the case or holder (14), said resilient holder engagingly conforming to the exterior of said rigid box to retain said box in said holder, said rigid box (32) being comprised of two rectangular shaped telescoping portions (50, 52), each partially fitted with each other and defining a fitting area between said two portions and tightly pressed by the resilient holder (14), said rigid box being, provided with a first sealing gasket (52) and a second sealing gasket (66), said first sealing gasket (62) being interposed in the fitting area and enclosed between the two portions (50, 52), so that the resilience of the holder (14) contributes in sealingly closing the rigid box (32), and snapping coupling means (58, 60) for engaging the two portions (50, 52) of the rigid box (32), said snapping coupling means being internally of said two portions when said two portions are engaged, and said first gasket (62) being external of said snapping coupling means, the container, rigid box (32), being transversely divided into said two portions (50, 52), the first portion (50) of said two portions being provided with an area (54) having externally reduced walls, axially extending, and housing at a border with thicker walls, said first sealing gasket (62) being engaged by a basis face of the second portion (52) of said two portions and the second portion (52) being provided with an enlarged seat (56), provided through inside reduction of the walls thereof for housing a reduced wall area (54) of the first portion (50) without any contraction of the enlarged seat (56) with respect to the wall area (54), housing on a bottom the said second elastic sealing gasket (66) within said fitting area engaged with the basis of the first portion (50).

3. The watertight container, as claimed in claim 2, wherein the gaskets (62, 66) are rubber O-ring gaskets.

4. The watertight container, as claimed in claim 2, wherein the snap coupling means for providing a forced holding of the internally reduced wall area (54) of the second portion (52) includes at least a protruding ridge (58) for providing a forced holding of the wall area (54) in the enlarged seat (56) engaging a corresponding slot (60) of the wall area (54) having a rigid externally reduced walls of the first portion (50) without any contraction of the enlarged seat with respect to the wall area (54).

5. The watertight container, as claimed in claim 4, wherein the ridges (58) protruding from the second portion (52) and the slots (60) of the first portion (50) are two in number and arranged on opposed sides and cooperate with each other without distorting the outer wall of said first portion to prevent removal of the reduced wall area (54) from the seat (56).

6. The watertight container, as claimed in claim 2, wherein the two portions (50,52) are each of a quite different size, one of said portions being of greater length than the other of said portions.

7. The watertight container, as claimed in claim 1, wherein the rigid box (32) is provided with a peripheral groove or slot (72) for housing an elastic safety clamping means, said clamping means including an O-ring gasket having an internal perimeter shorter than an external perimeter of said slot (72).

8. The watertight container, as claimed in claim 2, including an elastic clamping means comprising an O-ring gasket (74) having an internal perimeter a little less than an external perimeter of a shell (32).

9. The watertight container, as claimed in claim 2, wherein the case (14), comprises fastening means for fastening the wrist strap (12) to the rigid box (32), and includes an elastic shell frame having a first side appearing as a peripheral thickened frame portion and a second side appearing as a frame portion around an opening closed by a substantially rectangular flap (30), hinged at a long side along the frame itself and coupled, at the opposed long side, to the frame by means of holes (34) for receiving corresponding pins (36) inserted into the frame and the strap (12) and the resilient holder (16) and the rectangular flap (30) together with a covering portion (28) for the box forms a continuous member.

10. The container, as claimed in claim 9, wherein the first side of the elastic is an external side and the second side of the elastic shell is an internal side.

11. The container, as claimed in claim 9, wherein the first side of the elastic shell is an internal side and the second side of the elastic shell is an external one and said strap (12) cooperates with said rectangular flap (30) to press said rigid box (32) against said covering portion (28) to provide fastening of said rigid box to said strap (12).

12. The container, as claimed in claim 2, including fastening means for fastening the wrist straps to said rigid box and including a flap on a side of the frame provided with holes (34) and insertable pins (36) insertable into said flap (30) and into said holes (34), said flap cooperating with said pins (36) to exert pressure of the box against a covering portion (28).

13. The container, as claimed in claim 9, wherein the fastening means is a snap fastener.

14. The container, as claimed in claim 9, wherein the fastening means includes for closure of the flap (30) a first fabric strip provided, on a side and a second fabric strip cooperating with said first fabric strip cooperating with said first fabric strip provided on an opposed side which are engageable with each other as loop and hook fasteners.

15. The watertight container, as claimed in claim 9, wherein the fastening means includes a ridge on one side of the flap (30) for closure of the flap (30) and a related slot on an opposed side of the flap.

16. The container, as claimed in claim 9, wherein the fastening means is a zip fastener.

* * * * *